A. D. WESTBROOK.
CHEESE HOOP.

No. 179,833.  Patented July 11, 1876.

Witnesses.
Otto Stufeland
Robt. E. Miller

Inventor.
Abraham D. Westbrook
per
Van Santvoord & Hauff
Attorneys

UNITED STATES PATENT OFFICE.

ABRAHAM D. WESTBROOK, OF LAMBERTVILLE, NEW JERSEY.

IMPROVEMENT IN CHEESE-HOOPS.

Specification forming part of Letters Patent No. 179,833, dated July 11, 1876; application filed June 5, 1876.

*To all whom it may concern:*

Be it known that I, ABRAHAM D. WESTBROOK, of Lambertville, in the county of Hunterdon and State of New Jersey, have invented a new and useful Improvement in Cheese-Hoops, which improvement is fully set forth in the following specification, reference being had to the accompanying drawing, in which—

Figure 1:
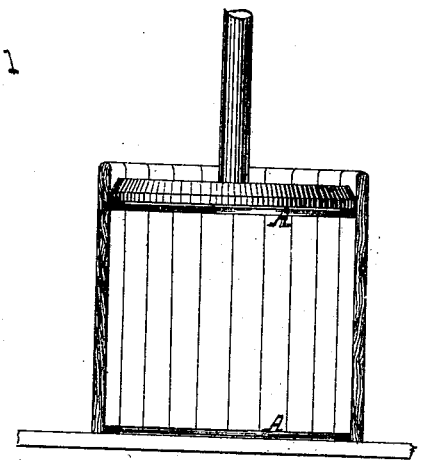
Figure 2:
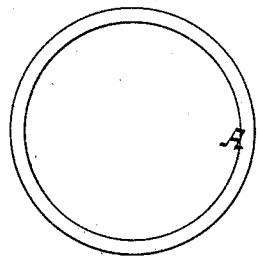
Figure 3:

Figure 1 represents a transverse vertical section of a cheese-hoop provided with my improvement. Fig. 2 is a plan of my improved washer or ring. Fig. 3 is a transverse section of the same on a larger scale than the previous figures.

Similar letters indicate corresponding parts.

This invention consists in the combination of a ring made of gutta-percha with the follower and ring of a cheese-press.

In the operation of pressing cheese the most common way is to place a press-cloth under the follower, for the purpose of preventing the curd and whey from escaping at the joint between the hoop and press-board, and at the sides of the follower. Other devices have been substituted for these press-cloths, such as rings of wood, sheet metal, or elastic india-rubber. All these devices, however, are attended with certain disadvantages. The rings of wood soon become saturated with the whey, which causes them to swell, so that they cannot be easily removed from the hoop. The metallic rings do not produce good joints, and they are attacked by the whey, causing them to break, and the cheese to become colored and spoiled. The elastic rings of india-rubber produce tight joints, but they are also attacked by the curd and whey, whereby a bad odor is imparted to the cheese, and the cheese is liable to become colored. These elastic rings are also difficult to remove from the hoop when a cheese has been pressed. All these disadvantages are obviated by my invention.

The rings A, which I use, are made of gutta-percha. Such rings have no more elasticity than rings made of wood; they do not swell by the action of the curd or whey, nor do they impart any bad odor or color to the cheese; they can be readily removed from the press and replaced; they are easily cleaned, and they are superior in durability to rings made of wood, metal, or india-rubber.

I do not claim, broadly, as my invention the use of a packing-ring in a cheese-hoop, such having heretofore been used.

What I claim as new, and desire to secure by Letters Patent, is—

The gutta-percha packing-ring A, as arranged in relation to a cheese-hoop and its follower, substantially as and for the purposes herein shown and described.

In testimony that I claim the foregoing I have hereunto set my hand and seal this 29th day of May, 1876.

A. D. WESTBROOK. [L. S.]

Witnesses:
 W. HAUFF,
 E. F. KASTENHUBER.